United States Patent [19]

Oare et al.

[11] Patent Number: 5,115,853
[45] Date of Patent: May 26, 1992

[54] PNEUMATIC TIRE WITH BELT OVERLAY STRUCTURE REINFORCED WITH LOW DENIER NYLON CORDS

[75] Inventors: Thomas R. Oare, Suffield; James C. Sykora, Uniontown, both of Ohio

[73] Assignee: The Goodyear Tire & Rubber Company, Akron, Ohio

[21] Appl. No.: 467,422

[22] Filed: Jan. 19, 1990

Related U.S. Application Data

[63] Continuation-in-part of Ser. No. 320,649, Mar. 8, 1989, abandoned.

[51] Int. Cl.⁵ .......................... B60C 9/22; B60C 9/24
[52] U.S. Cl. .................... 152/527; 152/451; 152/531; 152/533; 152/536
[58] Field of Search ............... 152/527, 531, 451, 533, 152/536; 57/902

[56] References Cited

U.S. PATENT DOCUMENTS

| | | |
|---|---|---|
| 3,130,769 | 4/1964 | Hindin et al. |
| 3,606,921 | 9/1971 | Grawey |
| 3,776,792 | 12/1973 | Grawey |
| 3,850,219 | 11/1974 | Snyder ........................ 152/531 |
| 3,889,457 | 6/1975 | Kenyon et al. ................ 57/902 X |
| 3,990,493 | 10/1974 | Caretta |
| 3,991,803 | 11/1976 | Praszek |
| 4,135,565 | 1/1979 | van der Burg |
| 4,140,168 | 2/1979 | Caretta |
| 4,202,394 | 5/1980 | van der Burg |
| 4,284,117 | 8/1981 | Poque et al. ................... 152/527 |
| 4,724,881 | 2/1988 | Poque et al. ................. 152/531 X |
| 4,739,814 | 4/1988 | Berczi et al. |
| 4,877,073 | 10/1989 | Thise et al. ................. 152/527 X |

FOREIGN PATENT DOCUMENTS

| | | |
|---|---|---|
| 0258822 | 3/1988 | European Pat. Off. |
| 0320290 | 12/1988 | European Pat. Off. |
| 2107817 | 2/1971 | Fed. Rep. of Germany |
| 3535064 | 10/1986 | Fed. Rep. of Germany |
| 1416538 | 9/1965 | France |
| 62-203803 | 9/1987 | Japan |
| 62-225406 | 10/1987 | Japan |
| 62-251202 | 11/1987 | Japan |
| 62-251203 | 11/1987 | Japan |
| 85964 | 1/1986 | Luxembourg |
| 1569640 | 6/1980 | United Kingdom |
| 2139575 | 11/1984 | United Kingdom |
| 1148120 | 4/1989 | United Kingdom |

Primary Examiner—Michael W. Ball
Assistant Examiner—Adrienne C. Johnstone
Attorney, Agent, or Firm—David E. Wheeler; L. R. Drayer

[57] ABSTRACT

A radial ply pneumatic tire (10) has an overlay structure (19) disposed radially outwardly of the belt reinforcing structure (14). The overlay structure (19) comprises side by side cables of 420/2 nylon having a cable twist of not greater than seven turns per inch.

19 Claims, 2 Drawing Sheets

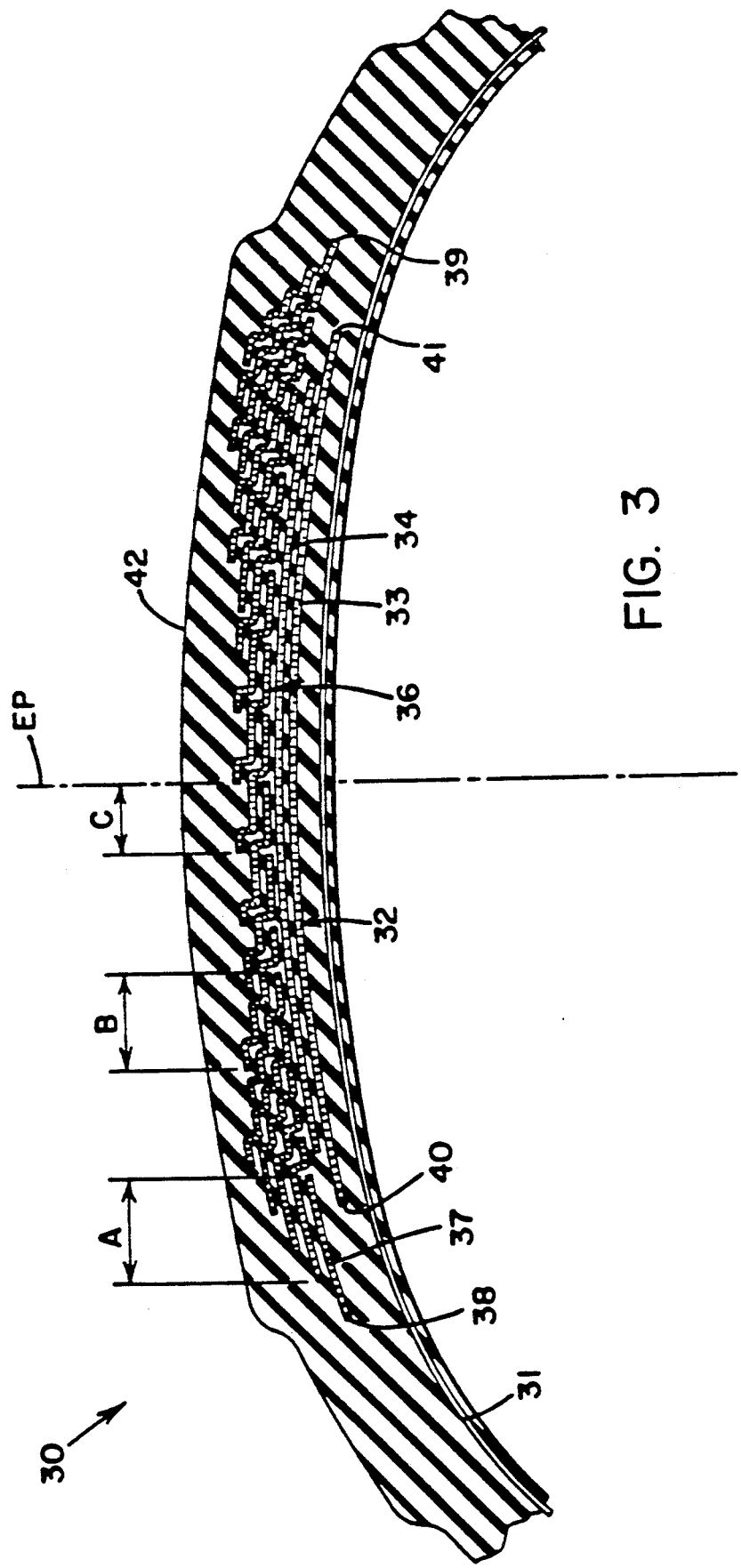

PNEUMATIC TIRE WITH BELT OVERLAY STRUCTURE REINFORCED WITH LOW DENIER NYLON CORDS

This is a Continuation-in-Part of Application Ser. No. 320,649, filed on Mar. 8, 1989, now abandoned.

The present invention relates generally to pneumatic tires and more specifically to tires having a textile reinforced overlay structure located radially outwardly of a belt reinforcing structure.

Improved durability and handling characteristics of high performance pneumatic tires may be attained by providing such tires with an overlay structure of nylon cables located between the belt structure and the tread structure. However, this solution is costly and adds undesirable weight and thickness to the tire. It has now been discovered that surprisingly the durability of a tire may be improved by using weaker cables in the overlay structure, at a comparatively lower cost and reduced weight and thickness over prior art overlay structures.

Various advantages and features of the invention will be apparent in the following description and claims, considered together with the drawings forming an integral part of the specification and in which:

FIG. 3 is a partial cross sectional view of a tire according to another aspect of the invention.

Figure 1:
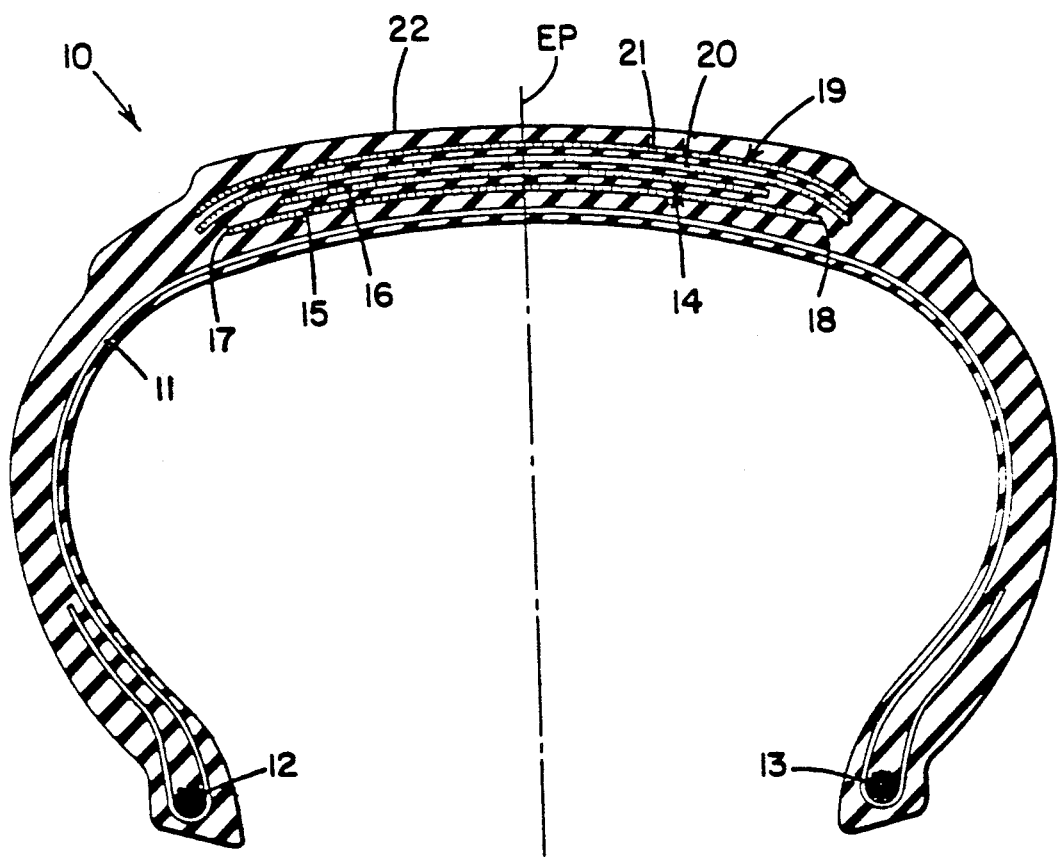
FIG. 1 is a cross-sectional view of a tire according to one aspect of the invention taken in a plane that includes the axis of rotation of the tire.

With reference to FIG. 1, a pneumatic tire 10 according to the invention has a radial ply carcass comprising at least one carcass ply 11 of side by side cables which is anchored about a pair of substantially inextensible annular beads 12,13. The cables of the carcass ply are oriented at 65° to 90° with respect to the equatorial plane EP of the tire. The equatorial plane EP is a plane which is perpendicular to the axis of rotation of the tire and is disposed midway between the sidewalls of the tire.

A belt reinforcing structure 14 is disposed radially outwardly of the carcass 11. As used herein and in the claims, "radially" refers to directions perpendicular to the axis of rotation of a tire and "axially" refers to directions parallel to the axis of rotation of the tire. The belt structure 14 comprises at least two belt plies 15,16 of side-by-side metallic or textile cables disposed at angles of about 15° to about 35° with respect to the equatorial plane EP of the tire.

An overlay structure 19 is disposed radially outwardly of the belt reinforcing structure 14 and is wrapped circumferentially thereabout. A tread 22 of an elastomeric compound is disposed radially outwardly of the overlay structure 19. Preferably, the overlay structure 19 extends axially outwardly of the lateral edges 17,18 of the widest belt ply 15. In the embodiment illustrated in FIG. 1, the overlay structure comprises a sheet of an elastomer having side by side nylon cables embedded therein with the sheet having an axial width which is greater than the distance between the lateral edges 17,18 of the widest belt ply 15 of the belt reinforcing structure 14. In the example shown in FIG. 1, there are two wraps 20,21 of the overlay ply around the belt structure. The overlay ply is usually applied to the unvulcanized tire as an annular layer, or layers, with the two end portions of the ply slightly overlapping to form a splice.

The overlay structure 19 comprises nylon cables arranged side by side and disposed at 0° to 5° with respect to the equatorial plane EP of the tire, each of said cables consisting of two yarns of nylon filaments with said yarns being twisted together with one another, each of said yarns having a denier of 420 (466 decitex) and each said cable having a cable twist of not greater than seven turns per inch. Preferably, the nylon is a type 6,6 nylon. Preferably, each cable of the overlay structure 19 has a twist structure of 6×6. As used herein and in the claims a twist structure of "6×6" is understood to mean a structure having a yarn twist of 6 turns per inch and a cable twist of 6 turns per inch. Preferably, each cable of the overlay structure has an elongation at break of 15% to 20% as determined by ASTM D885. Most preferably, each cable of the overlay structure has an elongation of about 7% when subjected to a load of 6 pounds (2.7 kg) as determined by ASTM D885.

However, problems with the overlay structures of the type illustrated in FIG. 1 have been recognized in the tire art. For example, the area of splice overlap in the overlay structure can cause problems with tire uniformity in that it provides an unbalanced portion of the tire. Furthermore, during manufacture of the tire, the overlap splice is subjected to stresses that can cause a deformation of the splice.

As taught in Luxembourg Patent 85,964, one solution to the problems with overlay structures of the type shown in FIG. 1 is to have the overlay structure comprise a ribbon of cable reinforced elastomeric material which is helically wound around the belt structure in a series of at least two helical convolutions.

Figure 2:
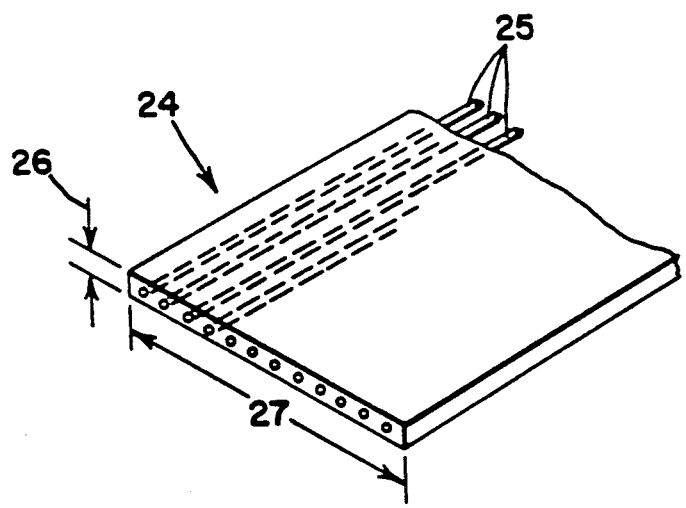
FIG. 2 is a diagrammatic view of a portion of a ribbon used in the practice of another aspect of the invention.

With reference to FIG. 2 a ribbon 24 useful in practicing a second embodiment of the present invention comprises an elastomeric material having nylon cables 25 arranged side by side and extending longitudinally of the ribbon. The ribbon has a width 27, preferably in the range of 10 to 40 mm, and a thickness 26, preferably in the range of 0.4 to 1.2 mm. The cables 25 in the ribbon 24 are identical to those described above for the embodiment illustrated in FIG. 1.

An overlay structure according to an alternate embodiment of the present invention comprises a single continuous ribbon of the type described above helically wound about the belt reinforcing structure. Adjacent turns of the ribbon about the belt structure may be axially spaced apart from one another, or in abutting relationship with one another, or in overlapping relationship with one another, or even in a variety of relationships within the same overlay structure. Preferably, adjacent turns of the ribbon are in an overlapping relationship as taught in commonly owned U.S. Pat. No. 4,869,307.

An example of the preferred embodiment of the invention is illustrated in FIG. 3. In the preferred embodiment, the tire 30 comprises a carcass ply 31 of side-by-side polyester or rayon cables. A belt reinforcing structure 32 comprising two belt plies 33,34 of steel cables is disposed radially outwardly of the carcass ply. The overlay structure 36 is disposed radially outwardly of the belt structure 32, and a tread 42 is disposed radially outwardly of the overlay structure. The lateral edges 38,39 of the overlay structure are disposed axially outwardly of the lateral edges 40,41 of the widest belt ply.

The overlay structure 36 comprises a single continuous ribbon 37 helically wound about the belt reinforcing structure 32 with adjacent turns of the ribbon in an overlapping relationship such that the ribbon and nylon cables embedded therein are disposed at 0° to 5° with respect to the equatorial plane EP of the tire. In a most preferred embodiment, the overlay structure comprises a center portion and a pair of axially outer portions with the width of the overlap of adjacent turns of the ribbon being greater in the axially outer portions than the width of the overlap in the center portion. If desired, the width of the overlap increases gradually as shown at C in the center portion B in a middle portion and A at an edge portion. For example, in the center portion, the overlap should be in the range of 0% to 75% preferably 50% to 70% of the width of the ribbon, in a middle portion, the overlap B should be 0% to 85% of the width of the ribbon, and at an axially outer portion, the overlap C should be 50% to 95% preferably 80% to 95% of the width of the ribbon. If the machinery employed in manufacturing the tire is very accurately controlled, the adjacent turn of the ribbon in a central portion of the overlay structure (that is near the equatorial plane EP) may be in abutting relationship while the adjacent turns of the ribbon in the axially outer portions of the overlay structure are overlapped about 80% to 95% of the width of the ribbon.

Tires have been manufactured according to the most preferred embodiment wherein the carcass ply comprised polyester fabric, the belt plies comprised 2×3.0 high tensile steel cables and the ribbon 37 of the overlay structure was 25 mm wide, 0.022" (0.6 mm) thick, and contained 30–34 nylon cables of the type already described herein.

While certain representative embodiments and details have been shown for the purpose of illustrating the invention, it will be apparent to those skilled in the art that various changes and modifications may be made therein without departing from the spirit or scope of the invention.

We claim:

1. A pneumatic tire comprising a radial ply carcass, a belt reinforcing structure disposed radially outwardly of said carcass and an overlay structure disposed radially outwardly of the belt reinforcing structure and wrapped circumferentially thereabout, the overlay structure having an axial width that is at least equal to that of the belt reinforcing structure, said overlay structure comprising a single continuous ribbon helically wound about the reinforcing structure with adjacent turns of the ribbon being in an overlapping relationship, said ribbon comprising cables arranged side by side and disposed at 0° to 5° with respect to the equatorial plane of the tire, each of said cables consisting of two yarns of nylon filaments with said yarns being twisted together with one another, each of said yarns having a denier of 420, and each said cable having a cable twist of not greater than 7 turns per inch, wherein each said cable of the overlay structure has an elongation at break of 15% to 20% as determined by ASTM-D885, and an elongation of about 7% when subjected to a load of 6 pounds as determined by ASTM-D-885.

2. A pneumatic tire according to claim 1 wherein each said cable of the overlay structure has a twist structure of 6×6.

3. A pneumatic tire comprising a radial ply carcass, a belt reinforcing structure disposed radially outwardly of said carcass and an overlay structure disposed radially outwardly of the belt reinforcing structure, the overlay structure having an axial width that is at least equal to that of the belt reinforcing structure, the overlay structure comprising a single continuous ribbon helically wound about the belt reinforcing structure, said ribbon comprising cables embedded in an elastomeric material, said cables being arranged side by side and extending longitudinally of the ribbon, said ribbon and cables being disposed at 0° to 5° with respect to the equatorial plane of the tire, each of said cables consisting of two yarns of nylon filaments with said yarns being twisted together with one another, each of said yarns having a denier of 420, and each said cable having a cable twist of not greater than 7 turns per inch.

4. A pneumatic tire according to claim 3 wherein each said cable of the overlay structure has a twist structure of 6×6.

5. A pneumatic tire according to claim 3 wherein each said cable of the overlay structure has an elongation at break of 15% to 20% as determined by ASTM D885.

6. A pneumatic tire according to any one of claims 3 to 5 wherein each said cable of the overlay structure has an elongation of about 7% when subjected to a load of 6 pounds as determined by ASTM D885.

7. A pneumatic tire comprising a radial ply carcass, a belt reinforcing structure disposed radially outwardly of said carcass and an overlay structure disposed radially outwardly of the belt reinforcing structure, the overlay structure having an axial width that is at least equal to that of the belt reinforcing structure, the overlay structure comprising a single continuous ribbon helically wound about the belt reinforcing structure with adjacent turns of the ribbon being in an overlapping relationship, said ribbon comprising cables embedded in an elastomeric material, said cables being arranged side by side and extending longitudinally of the ribbon, said ribbon and cables being disposed at 0° to 5° with respect to the equatorial plane of the tire, each of said cables consisting of two yarns of nylon filaments with said yarns being twisted together with one another, each of said yarns having a denier of 420, and each said cable having a cable twist of not greater than 7 turns per inch.

8. A pneumatic tire according to claim 7 wherein each said cable of the overlay structure has a twist structure of 6×6.

9. A pneumatic tire according to claim 7 wherein each said cable of the overlay structure has an elongation at break of 15% to 20% as determined by ASTM D885.

10. A pneumatic tire according to claim 9 wherein each said cable of the overlay structure has an elongation of about 7% when subjected to a load of 6 pounds as determined by ASTM D885.

11. A pneumatic tire comprising a radial ply carcass, a belt reinforcing structure disposed radially outwardly of said carcass and an overlay structure disposed radially outwardly of the belt reinforcing structure, the overlay structure having an axial width that is at least equal to that of the belt reinforcing structure, the overlay structure comprising a single continuous ribbon helically wound about the belt reinforcing structure with adjacent turns of the ribbon being in an overlapping relationship, said overlay structure comprising a center portion and a pair of axially outer portions with the width of the overlap of adjacent turns of said ribbon being greater in the axially outer portions than in the center portion, said ribbon comprising cables embedded in an elastomeric material, said cables being arranged side by side and extending longitudinally of the ribbon, said ribbon and cables being disposed at 0° to 5° with respect to the equatorial plane of the tire, each of said cables consisting of two yarns of nylon filaments with said yarns being twisted together with one another, each of said yarns having a denier of 420, and each said cable having a cable twist of not greater than 7 turns per inch.

12. A pneumatic tire according to claim 11 wherein each said cable of the overlay structure has a twist structure of 6×6.

13. A pneumatic tire according to claim 11 wherein each said cable of the overlay structure has an elongation at break of 15% to 20% as determined by ASTM D885.

14. A pneumatic tire according to claim 11 wherein each said cable of the overlay structure has an elongation of about 7% when subjected to a load of 6 pounds as determined by ASTM D885.

15. A pneumatic tire comprising a radial ply carcass, a belt reinforcing structure disposed radially outwardly of said carcass and an overlay structure disposed radially outwardly of the belt reinforcing structure, the overlay structure having an axial width that is at least equal to that of the belt reinforcing structure, the overlay structure comprising a single continuous ribbon helically wound about the belt reinforcing structure with adjacent turns of the ribbon being in an abutting relationship in a center portion of the overlay structure and adjacent turns of the ribbon being in overlapping relationship in a pair of axially outer portions of he overlay structure, said ribbon comprising cables embedded in an elastomeric material, said cables being arranged side by side and extending longitudinally of the ribbon, said ribbon and cables being disposed at 0° to 5° with respect to the equatorial plane of the tire, each of said cables consisting of two yarns of nylon filaments with said yarns being twisted together with one another, each of the yarns having a denier of 420, and each said cable having a cable twist of not greater than 7 turns per inch.

16. A pneumatic tire according to claim 15 wherein each said cable of the overlay structure has a twist structure of 6×6.

17. A pneumatic tire according to claim 15 wherein each said cable of the overlay structure has an elongation at break of 15% to 20% as determined by ASTM D885.

18. A pneumatic tire according to claim 15 wherein each said cable of the overlay structure has an elongation of about 7% when subjected to a load of 6 pounds as determined by ASTM D885.

19. A pneumatic tire comprising a radial ply carcass of side by side cables comprising a material selected from the group consisting of polyester and rayon, a belt reinforcing structure disposed radially outwardly of said carcass and comprising side by side steel cables, and an overlay structure disposed radially outwardly of the belt reinforcing structure, the overlay structure having an axial width that is at least equal to that of the belt reinforcing structure, the overlay structure comprising a single continuous ribbon helically wound about the belt reinforcing structure with adjacent turns of the ribbon being in an overlapping relationship, said overlay structure comprising a center portion and a pair of axially outer portions with the width of the overlay of adjacent turns of said ribbon being greater in the axially outer portions than in the center portion, said ribbon comprising cables embedded in an elastomeric material, said cables being arranged side by side and extending longitudinally of the ribbon, said ribbon and cables being disposed at 0° to 5° with respect to the equatorial plane of the tire, each of said cables consisting of two yarns of nylon 6.6 filaments with said yarns being twisted together with one another, each of said yarns having a denier of 420, and each said cable having a twist structure of 6×6 and wherein each said cable of the overlay structure has an elongation at break of 15% to 20% as determined by ASTM D885, and an elongation of about 7% when subjected to a load of 6 pounds as determined by ASTM D885.

* * * * *